April 20, 1943.    W. B. FELL    2,316,777
MACHINIST'S PRECISION LEVEL
Filed Aug. 1, 1940    2 Sheets-Sheet 1
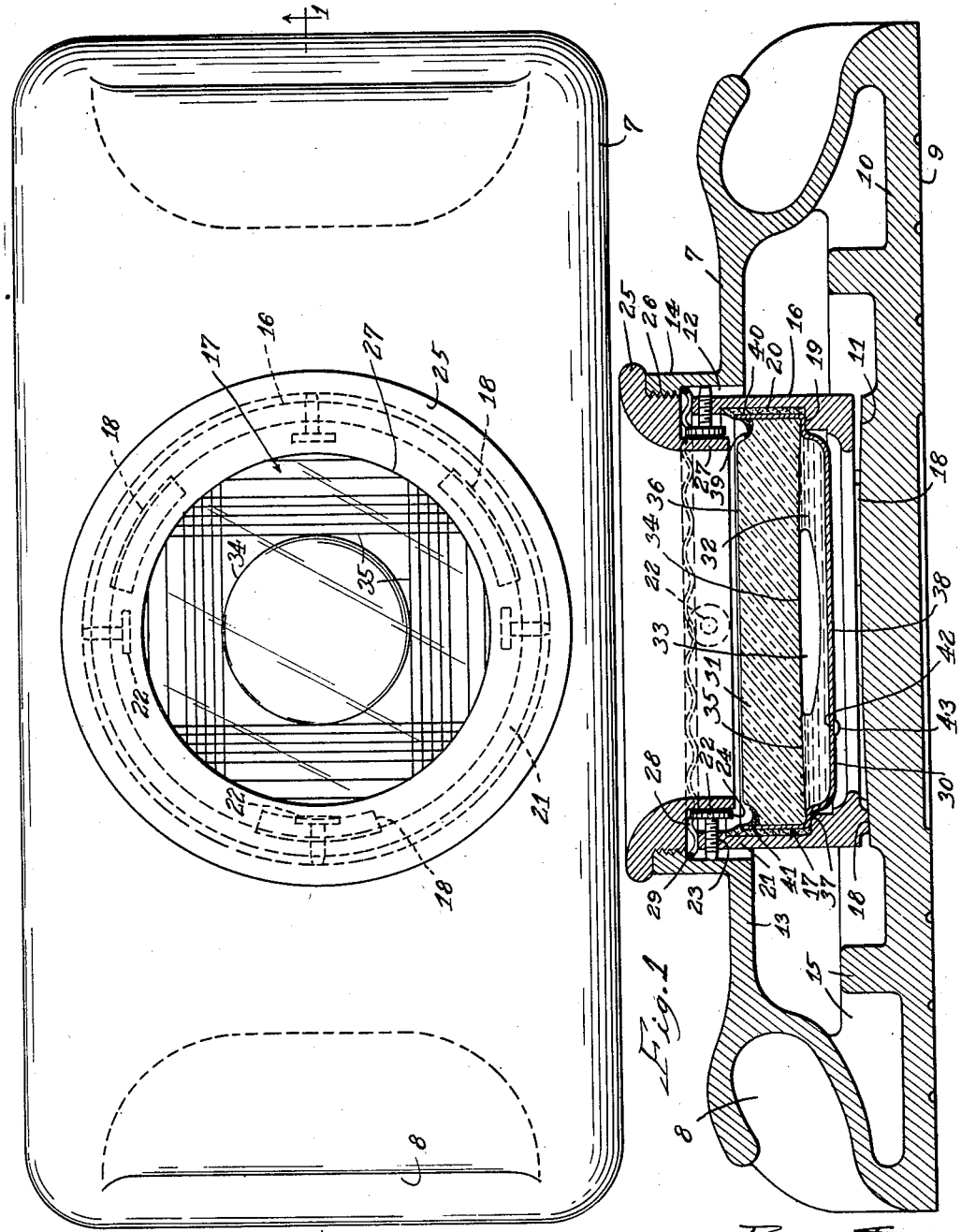
Inventor:
William B. Fell
By
McAnna, Wintercorn & Morsbach
Attys.

April 20, 1943.  W. B. FELL  2,316,777
MACHINIST'S PRECISION LEVEL
Filed Aug. 1, 1940  2 Sheets-Sheet 2
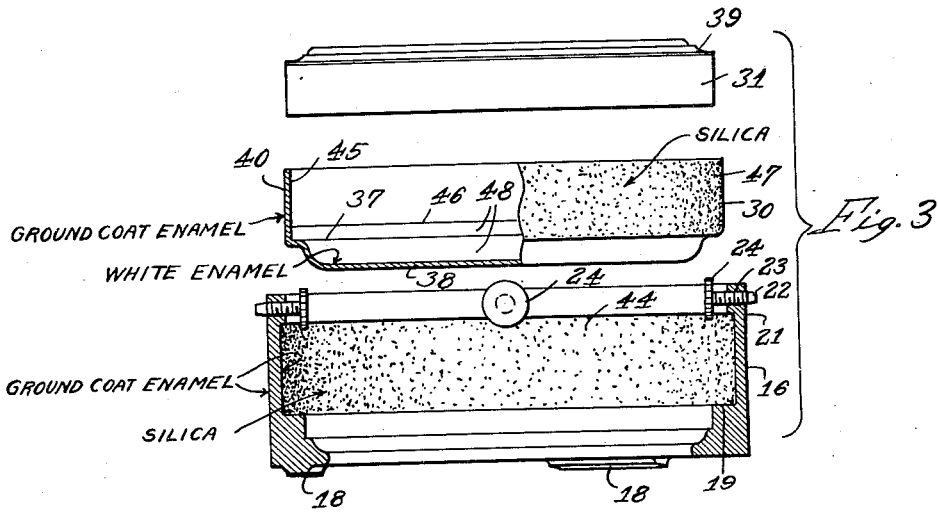
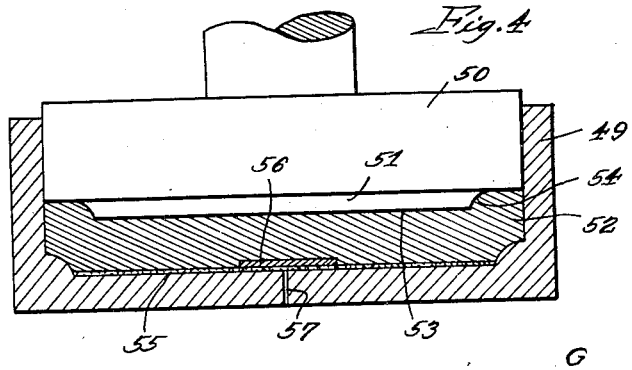
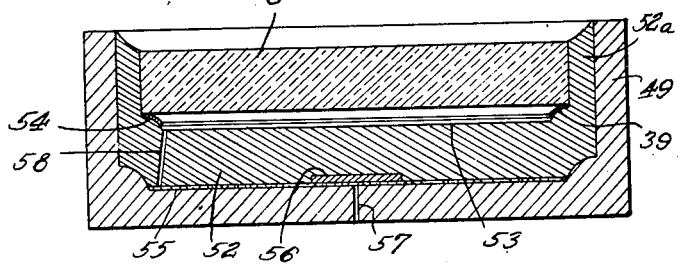
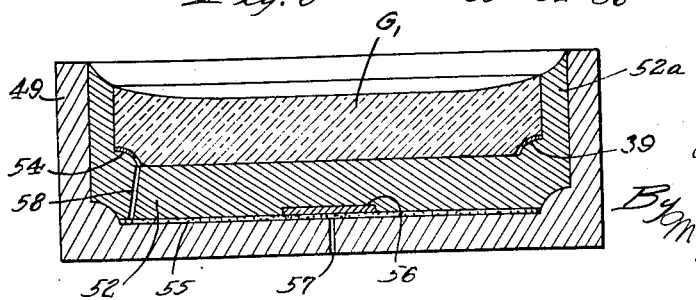
Inventor:
William B. Fell
By McCanna, Wintercorn
& Morsbach
Attys.

Patented Apr. 20, 1943

2,316,777

UNITED STATES PATENT OFFICE 2,316,777

MACHINIST'S PRECISION LEVEL

William B. Fell, Rockford, Ill.

Application August 1, 1940, Serial No. 349,133

20 Claims. (Cl. 33—212)

This invention relates to machinist's precision levels, and is particularly concerned with improvements in the type of spirit level disclosed in my copending application Serial No. 208,173, filed May 16, 1938.

In the earlier application I disclosed a spherical type spirit level which makes possible the leveling of a surface with one setting as distinguished from the tubular levels heretofore commonly used in machine shops which require moving the level several times in positions at 90° from one another, requiring special precautions to be sure of each setting of the level that the surface on which the level is placed is clean. In the manufacture of spherical type spirit levels, various problems are presented which it is the principal object of my invention to overcome to the end that these levels may be produced in large quantities uniformly well and at a reasonably low cost.

One of the salient features of the present invention lies in the provision of a thin-walled sheet metal cup in conjunction with the graduated glass disk to serve as a container for the liquid with the large circular air bubble therein movable with respect to a spherical surface on the under side of the disk, the disk being sealed in place in the rim portion of the cup, and the bottom portion of the cup serving as a resilient diaphragm to compensate for changes in temperature so that the bubble will not vary in diameter too greatly.

Still another important feature is the provision of a metallic holder for the level unit having pad portions in circumferentially spaced relation on the bottom thereof for engagement with a spherical surface on the supporting frame or base while the upper rim portion of the holder has radially disposed adjusting screws in circumferentially spaced relation for direct contact with the inside of a neck portion on the supporting frame to permit quick and easy adjustment of the level unit relative to the suporting frame, the holder being arranged after satisfactory adjustment to be clamped resiliently in adjusted position.

The invention is illustrated in the accompanying drawings, in which—

Figure 1 is a longitudinal vertical section through a level instrument made in accordance with my invention, the section being taken on the line 1—1 of Fig. 2;

Fig. 2 is a plan view of Figure 1;

Fig. 3 is an exploded view of the glass disk, sheet metal cup, and cast holder for the level unit made up of the cup and disk, these views serving to give a better illustration of the construction, and Figs. 4, 5, and 6 are sectional views showing three steps in the production of the glass disk with the metal ring fused thereto.

The same reference numerals are applied to corresponding parts throughout the views.

Referring first to Figures 1 and 2, the numeral 7 designates the frame or base which is of hollow cast iron construction and generally rectangular in form, with pockets 8 molded therein at opposite ends, wherein the operator may insert the four fingers of both hands in lifting the instrument out of its carrying case and placing it on the work. The bottom 9 is lapped true. The bottom wall 10 has a spherical surface 11 formed on the top thereof at the center of the base, below and concentric with the opening 12 provided in the top wall 13 of the base. The opening 12 is defined by an upwardly projecting neck 14 cast integral with the top wall 13. The bottom wall 10 has a number of reenforcing ribs 15 cast integral therewith, as shown, so as to eliminate danger of distortion and consequent unevenness of the bottom surface 9, without involving too much weight. 16 is a holder for the level unit, indicated generally by the reference numeral 17. The holder is of cast iron construction and has three pad portions 18 in equally circumferentially spaced relation provided on the bottom thereof arranged to be ground spherically concave on a long radius approximately equal to that for surface 11 and to bear on the spherical surface 11. The level unit rests on an annular shoulder 19 provided therefor in the holder 16, plaster of Paris or other suitable means indicated at 20 being provided for cementing the level unit in place on the annular shoulder 19 within the rim portion 21 of the holder. Four screws 22 are provided 90° apart threaded in radial holes 23 provided in the rim portion 21 of the holder and these screws have knurled heads, as indicated at 24, which are easily accessible when the cover ring 25 is removed, the screws being adjustable radially outwardly into engagement with the inside of the neck 14 into which the rim portion 21 projects, as clearly appears in Figure 1. Obviously, by adjusting diametrically opposed screws, tightening one and loosening the other, one may readily adjust the level unit 17 by means of the holder 16 in whatever direction and to the small extent required. A compound adjustment is obtained by the loosening of two screws 90° apart and the tightening of the diametrically opposite ones. The level will, of course, be accurately adjusted by the level manufacturer at the time the instrument is assembled and will not thereafter require much, if any, adjustment and for that reason it is thought best to have the heads 24 of the screws effectively concealed once the level has been properly adjusted. The cover ring 25 is threaded onto the neck 14, as indicated at 26, and has a circular inner skirt 27 which conceals the adjusting screws 22 when the cover ring is threaded in place. A split spring wire ring 28 bent to wavy form is inserted under an annular internal shoulder 29 provided therefor in the neck 14 and engages the top of the rim portion 21 of the holder 16 to keep the holder 16 and level unit 17 therein pressed resiliently into engagement with the spherical surface 11. This spring wire ring is also held against displacement by the cover ring 25. I have found that this simplified construction gives the desired results. It goes without saying that the simplification of the construction means quite an appreciable saving in cost of production.

The level unit 17 consists of a sheet metal cup 30, glass disk or lens 31, and the ether pool 32 with the air bubble 33 therein cooperating with the spherically concave bottom surface 34 of the glass disk, thus giving circular form to the bubble floating on the top of the pool. The spherical concavity of the bottom surface 34 of the glass disk 31 is very slight, being generated on a long radius from a center on the vertical axis of the spherical surface 11. The graduation lines 35 which extend at right angles to one another and are usually disposed substantially parallel to the edges of the base 7 are all scribed to the same depth in the bottom surface 34 of the glass disk before the same is given a spherically concave form and deep enough so as not to be obliterated by this grinding, the lines scribed or scored in the glass being filled with a suitable enamel which, when subsequently baked, will give permanent, easily visible graduation lines. The shallow spherical grinding of the bottom surface 34 is done only after the disk 31 is otherwise completed. Each scale division of the closely spaced graduation lines is equal to five ten-thousandths of an inch of movement in one linear foot so that errors may be read directly in ten-thousandths of an inch to the foot in any direction, which is well in excess of the ordinary needs of the machine tool industry. In Fig. 2, the bubble 33 appears in the exact center with the innermost graduation lines tangent thereto and it is obvious that any out of level condition can be detected at once by a shift in the position of the bubble with respect to the graduation lines, and one may level a surface with one setting instead of having to move the level several times in positions at 90° to one another, as with the tubular levels heretofore commonly in use in machine shops. The fact that the bubble 33 moves relative to the spherically concave surface 34 directly under the graduation lines 35 obviously makes for the best obtainable accuracy and closest reading possible. The top surface 36 of the glass disk is ground flat. The disk rests on an annular internal shoulder 37 provided therefor in the cup 30 at a predetermined elevation relative to the bottom wall 38 of the cup. A metal ring 39, preferably of sheet silver, is fused onto the top of the disk 31 and affords a means whereby the glass disk may be secured to the rim portion 40 of the cup 30 by soldering, as indicated at 41. The disk in actual practice fits fairly loosely in the rim of the cup and some solder finds its way between the glass and the rim and holds the glass tightly in position while the upper portion of the solder makes a seal for the glass. The thin wall construction of the cup 30 using a sheet steel with enough spring to it to serve the present purposes, enables considerable simplification of the level unit by eliminating the necessity for an extra spring diaphragm and perhaps additional tensioning spring means therefor, because the bottom wall 38 of the cup is adapted to give as internal pressure of the pool 32 thereon, due to changes in temperature, may require, so that the bubble 33 will not vary in diameter too greatly. The elimination of extraneous tensioning spring means and adjustments therefor not only simplifies and reduces the cost of the construction but there is the advantage also of eliminating a probable source of trouble due to tampering with the instrument. At 42 is indicated a small filling opening in the bottom 38 of the cup 30 which is sealed by solder, or in any other suitable manner, as indicated at 43, after the bottom portion of the cup under the glass disk 31 has been filled with the liquid ether or other fluid medium employed in conjunction with the air bubble 33.

The general construction of the level unit is best indicated in Fig. 3 in which the cup 30 is shown in separated relation to the holder 16, and the glass disk 31 is shown in disassociated relation to the cup, it being clear from the previous description that the disk 31 fits in the cup 30 and that the cup 30 is cemented in place in the holder 16. Now, the holder 16 is of cast iron construction and is enameled with a ground coat inside and out, excepting on the bottom surfaces of the pad portions 18 which are ground accurately to a spherical concavity to fit the spherically convex surface 11 in the frame 7. Prior to the baking of the enamel, silica is applied to the interior of the holder 16 on the annular portion 44 above the shoulder 19 to afford a rough surface for good bonding with the plaster of Paris or other cement 20 with which the space between the outside of the cup 30 and the inside of the holder 16 is filled. The cup 30 is also enameled with a ground coat, inside and out, with the exception of the inside portion 45 of the rim 40 down to the level of the line 46, the portion 45 being left bare so as to permit soldering thereto, as indicated at 41 in Figure 1. The outside 47 of the rim portion 40 is coated with silica prior to the baking of the enamel. The lower portion 48 of the inside of the cup 30 is given a second coat of white enamel in order to provide the desired background for the bubble 33 and graduation lines 35 for easy reading of the instrument. It is clear, therefore, that when the glass disk 31 with its metallic ring 39 fused thereon is inserted in the cup 30 resting on the annular shoulder 37 there is no difficulty in soldering the disk in place inasmuch as the surface 45 on the inside of the cup adjacent the metallic ring 39 on the disk is bare and solder will adhere thereto properly. Furthermore, since the outside portion 47 of the cup 30 is roughened by silica similarly as the inside portion 44 of the holder 16 just above the annular shoulder 19 on which the cup 30 rests, there is no difficulty in cementing the cup in the holder, using plaster of Paris or any other suitable cement, as indicated at 20 in Fig. 1, the cement adhering readily to the roughened surfaces 44 and 47.

The application of the metal ring 39 to the glass disk 31 presented a very difficult problem but I have found that a sliver ring will adhere satisfactorily to the glass disk if the glass disk is applied to the ring heated up to about 1500° F., at which temperature the glass commences to flow. The method forms no part of the present application but is illustrated in Figs. 4, 5 and 6. Fig 4 shows a crucible 49 in which a ram 50 having a concentric reduced end portion 51 is entered to tamp down a base 52 of lime with a central circular recess 53 formed in the top thereof defined by an annular shoulder 54 of substantially quarter round cross-section. Prior to pouring in the lime, the bottom of the crucible is supplied with a thin layer 55 of sand and a metal disk 56 is placed on the sand over a vent hole 57 provided in the bottom of the crucible. The sand provides interstices through which gases released in the subsequent heating of the crucible may find their way fairly readily to the vent 57 while the disk 56 protects the vent and the layer of sand over it so that the lime 52 will not be apt to plug the vent hole when the lime is tamped down. Still another vent hole 58 is preferably provided at one edge of the recess 53 through the layer of lime 52 to allow escape of gases from the recess when the glass disk G collapses into the recess in the heating of the crucible, as shown at G1 in Fig. 6. The silver ring 39 to be fused to the glass is first stamped between dies generally to the arcuate cross-section shown in Fig. 5 to fit on the shoulder 54 and is placed on the shoulder under the disk of plate glass G, as shown in Fig. 5, after which the space around the disk in the crucible is filled in with more lime, as indicated at 52a, thus making the crucible ready for putting in the furnace for heating of the glass disk to the fusion point. Fig. 6 illustrates the manner in which the ring 39 adheres to the glass disk G1 after the glass has been fused thereto, and actual experience has shown that the silver ring adheres very well when applied in this manner. The glass projects far enough beyond the plane of the ring 39 so that it can be ground off readily to provide the flat top surface 36 shown in Fig. 1. The bottom surface is also ground off flat after which the graduation lines 35 are ground therein, all to the same depth as previously described, the grooves forming the lines being filled with a suitable black enamel and baked, whereupon the bottom surface is ground to a spherically concave form, as indicated at 34 in Fig. 1. Thus, disk 31 is produced from disk G1.

It is believed the foregoing description conveys a good understanding of the objects and advantages of my invention. The appended claims have been drawn with a view to covering all legitimate modifications and adaptations.

I claim:

1. A level of the character described comprising a horizontal frame having a spherical surface thereon, a level unit including a receptacle and a lens therein together with a pool of liquid containing a circular air bubble movable under a spherical surface provided on the bottom of the lens relative to graduation lines also provided on the lens extending at right angles to one another, an adjustable support for the level unit having means slidably contacting the first-named spherical surface on the frame, the second-named spherical surface on the lens being on a center on the same vertical axis with the center of the first-named spherical surface, and means at right angles to one another and also at right angles to the graduation lines aforesaid for adjusting said support on the first-named spherical surface on the frame.

2. A level of the character described comprising a horizontal frame having a spherical surface thereon, a level unit comprising a circular metallic cup containing a circular glass disk which is sealed therein and provided with graduation lines on its bottom surface extending at right angles to one another, the glass disk having a spherical bottom surface, the cup containing in the bottom thereof beneath the glass disk a pool of liquid containing a circular air bubble movable under the spherical bottom surface of the glass disk relative to said graduation lines, an adjustable ring support for the level unit having said cup mounted therein, said ring support slidably contacting the first-named spherical surface on the frame, the second-named spherical surface on the glass disk being on a center on the same vertical axis with the center of the first-named spherical surface, and means at right angles to one another and also at right angles to the graduation lines aforesaid for adjusting said support on the first-named spherical surface on the frame.

3. A level comprising a metallic cup formed to provide a bottom wall and a peripheral rim portion, the cup being further formed to provide an annular shoulder therein adjacent the rim portion thereof and spaced above the bottom wall of the cup, said cup adapted to contain a pool of liquid in the bottom portion thereof with an air bubble therein, and a glass disk fitting within the rim portion of the cup and supported on the annular shoulder so that the bottom of the disk is in spaced relation to the bottom of the cup, said disk being secured in place in the cup in sealed relation to said rim portion peripherally of the disk and having graduation lines thereon, the bottom of said glass disk being spherical so as to give the air bubble in the pool of liquid a circular form.

4. A level comprising a metallic cup formed to provide an annular shoulder therein adjacent the rim portion thereof and spaced above the bottom wall of the cup, said cup adapted to contain a pool of liquid in the bottom portion thereof with an air bubble therein, and a glass disk fitting within the rim portion of the cup and supported on the annular shoulder so that the bottom of the disk is in spaced relation to the bottom of the cup, a metal ring applied to the rim portion of said glass disk, means cooperating with said ring for securing and sealing said disk in the cup, said disk having graduation lines on the bottom thereof, the bottom of said glass disk being spherical so as to give the air bubble in the pool of liquid a circular form.

5. A level comprising a metallic cup formed to provide a bottom wall and an annular rim portion around the same, said cup adapted to contain a pool of liquid in the bottom portion thereof with an air bubble therein, and a glass disk fitting within the rim portion of the cup and supported so that the bottom of the disk is in spaced relation to the bottom of the cup, said disk being sealed in place in the cup and having graduation lines on the bottom thereof, the bottom of said glass disk being spherical so as to give the air bubble in the pool of liquid a circular form, said glass disk having a flat top surface and the bottom of said glass disk having grooves provided therein to define said graduation lines, all of the grooves having their bottoms in a common horizontal plane substantially parallel with the flat top surface of the disk.

6. A level comprising a metallic cup formed to provide an annular rim portion circumscribing the bottom wall, said cup adapted to contain a pool of liquid in the bottom portion thereof with an air bubble therein, and a glass disk fitting within the rim portion of the cup and supported so that the bottom of the disk is in spaced relation to the bottom of the cup, a metal ring applied to the rim portion of said glass disk, means cooperating with said ring for securing and sealing said disk in the cup, said disk having graduation lines on the bottom thereof, the bottom of said glass disk being spherical so as to give the air bubble in the pool of liquid a circular form.

7. A leveling instrument comprising a frame, a level structure thereon comprising a metal cup formed to provide an annular rim portion circumscribing the bottom wall of the cup, said cup adapted to contain a pool of liquid in the bottom portion thereof with an air bubble therein, and a glass disk fitting within the rim portion of the cup and supported so that the bottom of the disk is in spaced relation to the bottom of the cup, said disk being sealed in place in the cup and having graduation lines on the bottom thereof, the bottom of said disk being spherical so as to give the air bubble in the pool of liquid a circular form, the bottom wall of said metal cup being sufficiently resilient so as to compensate for temperature change of the liquid and prevent excessive change in diameter of the air bubble, a support for holding the metal cup in spaced relation to the frame, the frame having a spherical surface thereon and the support having three equally circumferentially spaced pad portions on the bottom thereof slidably engaging said spherical surface for universal adjustment of the level structure relative to the frame, and means for holding said support in adjusted position relative to the frame.

8. As an article of manufacture, a cover glass for a spherical spirit level having a flat top surface and a spherical bottom surface conformed on a radius that is large in relation to the dimensions of said cover glass, the bottom surface being scored to provide graduation lines in transverse relation, all of the scorings reaching a common horizontal plane above the spherical bottom surface and substantially parallel to the flat top surface of the cover glass.

9. As an article of manufacture, a cover glass for a spherical spirit level having a flat top surface and a spherical bottom surface conformed on a radius that is large in relation to the dimensions of said cover glass, the bottom surface being provided with graduation lines in transverse relation, the top of the cover glass having an annular marginal shoulder in depressed relation to the flat top surface, and a metal ring applied to said cover glass on said shoulder.

10. As an article of manufacture, a container for the cover glass for the spherical spirit level comprising a one-piece sheet metal cup formed to provide a bottom wall having an upstanding annular shoulder portion for support of the cover glass spaced above the bottom wall, and an annular rim portion circumscribing the annular shoulder portion and adapted to fit around the cover glass and be secured thereto so as to provide a liquid-tight chamber in said container, the bottom wall being relatively thin and resilient and axially yieldable and resilient for the purpose described.

11. A device of the character described comprising a frame member having a bottom wall spaced below the top thereof, the bottom wall having a spherical surface on the top thereof in concentric relation with a neck defining a circular opening provided in the top of said frame member, a level unit including a cover glass and a pool of liquid containing a circular air bubble movable under a spherical surface on the bottom of the cover glass relative to graduation lines on the bottom of said cover glass extending at right angles to one another, a support for said level unit slidably engaging the first named spherical surface for universal tilting adjustment of the level unit, screws threaded in the support and extending radially outwardly for engagement with the inside of the neck so as to adjust the support relative to the spherical surface and hold the support in adjusted position, the screws being disposed in 90° relation to one another and to the aforesaid graduation lines, and a cover ring threaded on the neck and having an inner annular apron portion projecting into the upper portion of the support so as to conceal the adjusting screws.

12. A device of the character described comprising a frame member having a bottom wall spaced below the top thereof, the bottom wall having a spherical surface on the top thereof in concentric relation with a neck defining a circular opening provided in the top of said frame member, a level unit including a cover glass and a pool of liquid containing a circular air bubble movable under a spherical surface on the bottom of the cover glass relative to graduation lines on the bottom of said cover glass extending at right angles to one another, a support for said level unit slidably engaging the first named spherical surface for universal tilting adjustment of the level unit, screws threaded in the support and extending radially outwardly for engagement with the inside of the neck so as to adjust the support relative to the spherical surface and hold the support in adjusted position, the screws being disposed in 90° relation to one another and to the aforesaid graduation lines, spring means acting between the neck and said support to hold the support resiliently in engagement with the spherical surface, and a cover ring mounted on the neck and having an inner annular apron portion projecting into the upper portion of the support so as to conceal the adjusting screws.

13. A level comprising a metallic cup formed to provide an annular shoulder therein adjacent the rim portion thereof and spaced above the bottom wall of the cup, said cup adapted to contain a pool of liquid in the bottom portion thereof with an air bubble therein, and a glass disk fitting within the rim portion of the cup and supported on the annular shoulder so that the bottom of the disk is in spaced relation to the bottom of the cup, a metallic ring fused onto the rim portion of said glass disk so as to be in liquid-tight relation thereto, solder for securing the ring to the cup in liquid-tight relation thereto, said disk having graduation lines thereon, the bottom of said disk being spherical so as to give the air bubble in the pool of liquid a circular form.

14. A level comprising a metallic cup having a relatively thin and resilient bottom wall and an enclosing rim portion, said cup adapted to contain a pool of liquid in the bottom portion thereof with an air bubble therein, and a glass disk secured in liquid-tight relation to the rim portion of the cup in spaced relation to said bottom wall, said bottom wall being yieldable in response to changes in pressure in said cup due to changes in temperature of the liquid, whereby to maintain a nearly constant pressure in said cup for the purpose described.

15. As an article of manufacture, a cover glass for a spherical spirit level having a flat top surface and a spherical bottom surface conformed on a radius that is large in relation to the dimensions of said cover glass, one of said surfaces being provided with graduation lines, and a metal ring encircling the rim portion of said cover glass and fused thereto in liquid-tight relation.

16. A device of the character described comprising a frame member having a bottom wall spaced below the top thereof, the bottom wall having a spherical surface on the top thereof in concentric relation with a neck defining a circular opening provided in the top of said frame member, a level unit including a cover glass and a pool of liquid containing a circular air bubble movable under a spherical surface on the bottom of the cover glass relative to graduation lines on the bottom of said cover glass extending at right angles to one another, a support for said level unit slidably engaging the first named spherical surface for universal tilting adjustment of the level unit, screw adjusting means acting between the frame member and said support to adjust the support relative to the spherical surface and hold the support in adjusted position, and a cover ring mounted on the frame member having an inner annular apron portion projecting downwardly toward the cover glass.

17. A device of the character described comprising a frame member having a bottom wall spaced below the top thereof, the bottom wall having a spherical surface on the top thereof in concentric relation with a neck defining a circular opening provided in the top of said frame member, a level unit including a cover glass and a pool of liquid containing a circular air bubble movable under a spherical surface on the bottom of the cover glass relative to graduation lines on the bottom of said cover glass extending at right angles to one another, a support for said level unit slidably engaging the first named spherical surface for universal tilting adjustment of the level unit, screw adjusting means acting between the frame member and said support to adjust the support relative to the spherical surface and hold the support in adjusted position, spring means acting between the frame member and said support to hold the latter resiliently in engagement with the spherical surface, and a cover ring mounted on the frame member having an inner annular apron portion projecting downwardly toward the cover glass.

18. A device of the character described comprising a frame member having a bottom wall spaced below the top thereof, the bottom wall having a spherical surface on the top thereof in concentric relation with a neck defining a circular opening provided in the top of said frame member, a level unit including a cover glass and a pool of liquid containing a circular air bubble movable under a spherical surface on the bottom of the cover glass relative to graduation lines on the bottom of said cover glass extending at right angles to one another, a support for said level unit slidably engaging the first named spherical surface for universal tilting adjustment of the level unit, and screw adjusting means acting between the frame member and said support to adjust the support relative to the spherical surface and hold the support in adjusted position.

19. A device of the character described comprising a frame member having a bottom wall spaced below the top thereof, the bottom wall having a spherical surface on the top thereof in concentric relation with a neck defining a circular opening provided in the top of said frame member, a level unit including a cover glass and a pool of liquid containing a circular air bubble movable under a spherical surface on the bottom of the cover glass relative to graduation lines on the bottom of said cover glass extending at right angles to one another, a support for said level unit slidably engaging the first named spherical surface for universal tilting adjustment of the level unit, screw adjusting means acting between the frame member and said support to adjust the support relative to the spherical surface and hold the support in adjusted position, and spring means acting between the frame member and said support to hold the latter resiliently in engagement with the spherical surface.

20. A level comprising a one-piece sheet metal cup formed to provide a bottom wall having an upstanding annular shoulder portion and an annular rim portion circumscribing the annular shoulder portion, the bottom wall being relatively thin and resilient, said cup adapted to contain a pool of liquid in the bottom portion thereof with an air bubble therein, and a glass disk resting on said annular shoulder portion and secured in liquid-tight relation to the rim portion of the cup in spaced relation to the bottom wall, the bottom of said disk being spherical so as to give the air bubble in the pool of liquid a substantially circular form, said bottom wall being yieldable in response to changes in pressure in said cup due to changes in temperature of the liquid, whereby to maintain a nearly constant pressure in said cup, for the purpose described.

WILLIAM B. FELL.

CERTIFICATE OF CORRECTION.

Patent No. 2,316,777. April 20, 1943.

WILLIAM B. FELL.

It is hereby certified that error appears in the printed specification of the above numbered patent requiring correction as follows: Page 4, first column, line 72, claim 10, after the word "yieldable" insert --so as to yield in response to changes in pressure in the chamber resulting from changes in temperature of the liquid with changes in prevailing room temperature--; line 72-73, strike out "and resilient for the purpose described"; and that the said Letters Patent should be read with this correction therein that the same may conform to the record of the case in the Patent Office.

Signed and sealed this 15th day of June, A. D. 1943.

(Seal)

Henry Van Arsdale,
Acting Commissioner of Patents.